United States Patent Office 2,815,286
Patented Dec. 3, 1957

2,815,286

LIQUID SHORTENING

James R. Andre, Cincinnati, and Louis H. Going, Loveland, Ohio, assignors to The Procter & Gamble Company, Cincinnati, Ohio, a corporation of Ohio No Drawing. Application October 28, 1955,
Serial No. 543,593

19 Claims. (Cl. 99—118)

This invention relates to liquid shortenings. More specifically, it relates to opaque liquid shortenings, pourable at temperatures normally encountered, which can be so formulated as to be suitable for all normal baking and culinary uses with end results substantially equivalent to those obtained with conventional plastic shortenings.

Nearly all shortenings used today are glyceride fats in plastic form. Some 80%, more or less, of the composition of a typical plastic shortening is oil, which, if separated from the accompanying solid fats, would be liquid at room temperature. The plasticity of the shortening is due to its content of solid glycerides, usually including from about 8% to about 20% of hardstock, or "stearin," which is usually composed of trisaturated triglycerides, but which may include some solid monoglycerides and diglycerides. The crystalline form of the hardstock and other solid glycerides in the plastic shortening is such as to form throughout the liquid oil a network of crystals which has been likened to the network of a stack of straw.

It is possible, on the other hand, to disperse hardstock in liquid oil in such a crystalline condition that the hardstock does not give plastic body to the mass, but instead converts it to a more or less viscous pourable opaque liquid. U. S. Patents 2,521,219 and 2,521,242, both issued September 5, 1950, describe pumpable stable suspensions of hardstock in oil which may contain as much as 60 parts of hardstock to 40 parts of liquid oil. Most compositions within the ranges of these patents are too thick and viscous, and too grainy in appearance, to find ready acceptance as liquid shortenings for household use, and none of these have been found suitable for general cake-making purposes.

Ordinary triglyceride plastic shortenings can be used for all cooking purposes in the home. However, for use in cake baking, which provides an important test for shortening in the typical household, most processed plastic shortenings are "superglycerinated," i. e. contain several precent of monoglycerides, along with some diglycerides, which bestow so-called "high-ratio" properties to the shortening, and permit the successful use (as judged by cake volume, cake grain or texture, and tenderness when eaten) of a high ratio of sugar to flour in cake making. Numerous other "high-ratio" agents or emulsifiers can be substituted for mono- and diglycerides, including free fatty acids derived from edible oil, polyethylene oxide esters of fatty acids, fatty acid partial esters of polyglycerol, of sugar alcohols, of dehydrated sugar alcohols and the like (all having one or more unesterified hydroxyl groups), tartaric acid esters of fatty acids, and numerous other recognized organic compounds which broadly are characterized by an oil-soluble portion and one or more unesterified —OH groups or ether oxygen atoms. In a broad sense these are all equivalent to mono- and di-. glycerides in that they impart "high-ratio" properties to triglyceride shortenings. Solid forms of these "high-ratio" agents may be used in the practice of this invention.

It has long been realized that a liquid shortening would be much more convenient to use than a plastic shortening in that it could more readily be dispensed, measured, and mixed with other ingredients in making baked goods. This is true both as to commercial bakery practice and as to household uses. Indeed, clear vegetable oils, which are usually thought of as salad oils, or as cooking oils for use in frying and like purposes, have been used to some extent as shortening. Certain cake recipes have been developed which employ a liquid oil instead of a plastic shortening. However, when clear oils are used in conventional cake recipes they lack the ability to incorporate air, which is necessary for a successful shortening. Also, cake batters made with liquid oils are unstable emulsions and will not hold the gasses formed by air, incorporated by beating the batter or by the action of the baking acids.

In addition, clear liquid oil has only limited "high-ratio" properties, even when oil-soluble monoglycerides are incorporated, and its suitability for use in "high-ratio" cakes is limited to special recipes and special mixing procedures. Liquid monoglycerides derived from oils such as cottonseed oil and soybean oil do not impart general-purpose "high-ratio" performance. Although attempts have been made to find other additives which will impart all-purpose "high-ratio" properties in clear oil shortening, no such additives have been found which are free from objectionable features that stand in the way of their widespread use.

It has been found that a very satisfactory liquid shortening for home use can be made by combining at least 90% of liquid glycerides and not more than 10% of a dispersion of finely divided solid glycerides, at least a part of which are solid monoglycerides, when certain critical limitations as to proportions are observed, and when the solid glycerides are present in suitable physical form.

Accordingly, it is one of the objects of this invention to provide stable pourable shortenings containing solid glycerides dispersed in a liquid glyceride vehicle.

Another object is to provide pourable shortenings, suitable as substitutes for conventional plastic shortenings, when used in cake baking, without the necessity of using special recipes or techniques.

A further object is to produce a shortening which is much more convenient to dispense, measure, and mix with culinary ingredients than conventional plastic shortenings.

Yet another object is to provide a shortening suitable for frying which does not require the melting preparatory to use which is necessary in plastic shortenings.

Other objects and advantageous features will be apparent from the following specification.

The liquid shortening of this invention comprises a liquid glyceride vehicle in which are dispersed, substantially uniformly and stably, from about 2% to about 10% of finely divided, substantially fully saturated fatty glycerides, at least 80% of these saturated fatty glycerides being in the form of beta-phase crystals. The saturated fatty glycerides should include from about 1.0% to about 2.5%, by weight of shortening, of monoglycerides of fatty acids having from 16 to 22 carbon atoms, and may additionally include up to 9.0% of diglycerides of fatty acids having from 16 to 22 carbon atoms. When the shortening is cooled from 100° to 60° F. the amount of solids should not increase by more than about 20% of the solids content at 100° F.

A preferred product for temperate zone household use contains from about 5% to about 7%, of finely divided, substantially fully saturated fatty glycerides, at least 85% in the form of beta-phase crystals. The saturated fatty glycerides should include from 1.0% to about 2.3% monoglycerides and from 1.0% to 2.3% diglycerides.

The liquid glyceride oil which serves as a vehicle for the shortening of this invention should consist primarily of triglycerides. The vehicle should contain a minimum of glycerides having melting points higher than 60° F., so as to limit the solids increase when the shortening is cooled. It is desirable that the glyceride oil vehicle be chemically stable and resistant to oxidation.

Suitable oils may be derived from naturally occurring liquid glyceride oils such as cottonseed oil, soybean oil, peanut oil, rapeseed oil, sesame seed oil, and sunflower seed oil. Also suitable are liquid oil fractions obtained from palm oil, lard, and tallow, as for example, by graining or directed interesterification, followed by separation of the oil. Oils predominating in glycerides of unsaturated acids may required some hydrogenation to maintain flavor, but care should be taken not to greatly increase the amount of glycerides melting above 60° F. When oils are selected which have a larger amount of solids melting between 60° and 100° F. than are desirable, it may be necessary to separate out these solids. Refined cottonseed oil has proved to be especially suitable as a vehicle. Refined and slightly hydrogenated soybean oil has also proved very satisfactory.

Suitable vehicles may include certain di- or tri-glycerides in which one or two of the —OH groups of the glycerine have been replaced by acetic, propionic, butyric, or caproic radicals, and one or two of the remaining —OH groups of the glycerine have been replaced by acyl radicals of higher molecular weight saturated or unsaturated fatty acids having from 12 to 22 carbon atoms. For the purposes of this invention these glycerides, containing both high and low molecular weight acid radicals, hereinafter will be referred to as low molecular synthetic fats. The low molecular synthetic fats selected must be liquid at 60° F. In order to resist oxidation and to prevent rancidity it is preferred to select low molecular synthetic fats in which there are a minimum of carbon-to-carbon double bonds in the higher molecular weight fatty acid radicals, and preferably not more than two double bonds in any single acid radical. Normally liquid fatty acids of the oleic acid series, having a single carbon-to-carbon double bond, are ideal for the purpose.

The vehicle may also be composed of mixtures of any of the above-listed oils.

The finely divided fatty glycerides, which compose the solids suspended in the vehicle, must have a stable beta crystalline phase and must be capable of being converted to this beta phase from an alpha or beta-prime phase. A description of the nomenclature and determination of alpha, beta-prime, and beta phases, as well as the method of determining the beta-forming characteristics of fatty materials, is set forth in the aforementioned U. S. Patent 2,521,242, issued September 5, 1950, to P. J. Mitchell, Jr. For the purposes of this invention alpha-phase crystals may be identified by an X-ray diffraction pattern of a single strong short spacing at 4.15 A. The beta-prime crystals may be similarly identified by short spacings at 4.2 A. and 3.8 A. The beta-phase crystals have a short spacing at 4.6 A.

In the liquid shortenings of this invention it has been found that for good physical properties and stability of dispersion, at least about 80% of the glyceride solids should be in the form of beta-phase crystals. For a product uniformly pourable over a temperature range of 60° to 100° F. at least about 85% of the solids should be beta phase.

The fatty glycerides forming the solids must remain solid at temperatures as high as about 100° F., since it is important, during any lowering of temperature, that very few solids recrystallize in the form of interlacing crystals which would impair the fluidity of the shortening. Melting of solids between 60° and 100° F. may also tend to cause a separation of the liquid and solid phases at higher temperatures.

The solid fatty glycerides must be substantially saturated. A preferred class of solid glycerides should have an iodine value not greater than about 12.

If the shortening contains less than about 2% of solids, the suspension is likely to be unstable, and the solids will gradually settle out. Also, the product may not have the degree of opaque whiteness desired for some purposes. For proper consistency, appearance, and performance, the particles of glyceride solids should "fill up" the liquid vehicle. However, if more than about 10% of solids are present, the shortening may be too viscous to pour easily at temperatures as low as 60° F., and to drain well from a measuring cup.

In order to have the baking properties desirable in an all-purpose shortening the glyceride solids must be composed partly of monoglycerides of fatty acids having from 16 to 22 carbon atoms, or equivalent emulsifiers. At least 1.0% to 2.0%, by weight of the shortening, of a monoglyceride or its equivalent is necessary. The presence of much larger amounts of monoglyceride may cause an undesirable amount of smoking when the shortening is used for frying at elevated temperatures. For an all-purpose shortening, the monoglyceride content should be limited to not more than 2.5%. A preferred product will contain 1.0% to 2.3% monoglycerides.

Diglycerides which normally accompany monoglycerides need not be separated out before the monoglycerides are used in these liquid shortenings, and diglycerides of fatty acids having from 16 to 22 carbon atoms may be one of the components of the glyceride solids. As much as 9% of diglycerides may be present in the shortening. However, since the diglycerides transform to a beta-phase more slowly than other glycerides, a preferred product will containg from 1.0% to 2.3% diglycerides.

The balance of the fatty glyceride solids consists of suitable triglycerides, including tristearin, tripalmitan, and other normally solid triglycerides having strong beta-forming tendencies, such as palmito distearin, for example, or mixtures of such triglycerides. Included also are substantially completely saturated triglyceride fats made by hydrogenating vegetable and animal oils such as cottonseed oil, sunflower seed oil, linseed oil, hazelnut oil, soybean oil, peanut oil, olive oil, corn oil, palm oil, lard, tallow and mixtures of any of these.

At least a portion of the mixture of suitable liquid vehicle and glyceride solids can be prapared from triglyceride fats and fatty oils by random rearrangement or by directed rearrangement as described in U. S. Patent No. 2,442,531, issued to E. W. Eckey, June 1, 1948, preferably carrying the directed rearrangement as nearly to completion as possible.

Solids suitable for use in the shortenings of this invention may also be prepared by "superglycerinating" substantially saturated triglycerides to form mixtures of mono-, di- and triglycerides, and then adjusting the composition, if desired, by adding additional substantially saturated glycerides.

The shortening of this invention is preferably prepared by mixing together the liquid vehicle and the glyceride solids at a temperature sufficiently high that the mixture is completely liquid. The liquid mixture is quickly cooled to a temperature at which the glyceride solids will crystallize. Some crystallization may take place during the cooling step, but the mixture may then be held at the temperature of crystallization without heating or cooling from outside the system so as to cause substantially all of the solid glycerides to crystallize. The heat of crystallization may cause the temperatures to rise slightly. Slow stirring may be desirable.

It is preferred that the crystallization be performed rapidly enough that the crystals will not grow large enough to interlace or aggregate to form a plastic or unduly viscous mass. If the crystals are too large, gravity separation may cause them to settle to the bottom of the oil. Crystals small enough to be non-settling should be present in a sufficiently large amount that no clear oil will show. However, the crystals should not be so small that the fluid will be unduly viscous, or that the crystals will tend to melt or dissolve too rapidly during any subsequent heating or tempering step. Means for accomplishing this are illustrated in the examples which follow.

A part of the solids may initially form as beta-phase crystals. However, the rapid cooling step will result in the formation of a part of the solids as alpha- or beta-prime-phase crystals. The presence of a large amount of alpha- or beta-prime-phase crystals is highly undesirable since these crystals are needlelike in shape and tend to interlock and thereby stiffen the final product. The alpha-phase crystals are very soluble in the liquid vehicle and tend to dissolve and recrystallize with temperature changes, with the result that the final product will contain large crystals and will tend to separate into liquid and solid components at high temperatures and to solidify when exposed to low temperatures. Although beta-prime-phase crystals are less soluble in the liquid vehicle than are alpha-phase crystals, they also tend to cause separation.

If the proportion of alpha- or beta-prime-phase crystals is too great when substantially all of the solid glycerides have crystallized, it is necessary that the shortening be subjected to a suitable treatment to change these crystals to beta-phase crystals. This may be accomplished by a step, hereinafter referred to as tempering, in which the suspension is heated to a temperature at which there will be transformation from the alpha or beta-prime phases to a beta phase. A part of the alpha- or beta-prime phase crystals may dissolve. This tempering is preferably performed by maintaining the suspension between 90° and 100° F. until the desired amount of beta-phase crystals have formed. At temperatures below 90° F. the phase transformation proceeds very slowly. The rate of transformation increases with an increase in the tempering temperature. At temperatures above 100° F. the beta-phase crystals dissolve to too large an extent in the liquid vehicle. The dissolved solids will recrystallize when the temperature of the shortening is lowered after tempering is completed, and may then form as undesirable alpha- or beta-prime-phase crystals or as beta-phase crystals undesirably large in size.

The time required for phase transformation may be materially reduced if the shortening is mildly agitated during the tempering step.

The formation of solids as beta-phase crystals may be facilitated by "seeding" with nuclei of beta-phase crystals, which are added to the initial liquid mixture. Prior to addition of these beta-crystals, the liquid mixture must be cooled to a temperature sufficiently low that the added crystals will not melt. However, these crystals must be added prior to any crystallization of solids from the mixture.

Another method of transforming the crystals to a beta-phase is to heat the initially crystallized mixture to a temperature higher than the melting temperature of the alpha and beta-prime-phase crystals but below the melting temperature of the solids in a beta-phase. At this temperature, the mixture contains only beta-phase crystals and liquid. On subsequent cooling these beta-phase crystals serve as crystal nuclei for "seeding" the crystallization in a beta-phase.

The following examples will serve to illustrate the invention with greater particularity.

*Example 1.*—The following Table I lists several compositions of liquid shortenings of this invention. Each was prepared by melting together the liquid vehicle and solid glyceride fats. The liquid mixture was pumped through a heat exchanger where the temperature was adjusted to about 125° F. The mixture was then passed through a scraped-wall chilling machine, similar to that described in Vogt, U. S. Patents No. Re. 21,406, issued March 19, 1940 and No. 1,783,864, issued September 15, 1946, in which liquid is passed into an externally refrigerated cylinder. In this chiller the liquid was cooled rapidly (in less than 1 minute) to a temperature of about 70° F. Although some crystallization took place in the chiller, substantially complete crystallization of the solid glycerides was assured by passing the mixture through a "picker" box, a container in which material passes between moving and fixed blades. During the "picking" stage of 15 minutes the temperature increased about 5° F. from heat of crystallization. The mixture of liquid vehicle and crystallized glycerides was then passed through a heat exchanger, where the temperature was increased to about 95° F., into a tempering tank, where it was held for three hours, with mild agitation, at a temperature of about 90° to 95° F. At the conclusion of the tempering step the product was packaged.

Except when otherwise indicated, each of these compositions was prepared using refined, bleached, and deordorized cottonseed oil as the liquid vehicle. The solid glycerides were derived from refined and bleached soybean oil hydrogenated to an iodine value of about 8.

The stability is shown by percent oil separation after one month storage at 100° F. The separation is expressed as a percentage of the height of clear oil compared to the total height of liquid shortening in a stored container.

*Table I*

| | Percent Total Solids | Percent Mono-Glycerides (Approx.) | Percent Tri-Glycerides (Approx.) | Percent Separation |
|---|---|---|---|---|
| A | 8 | 1.8 | 4.0 | 0 |
| B | 8 | 1.6 | 4.8 | 0 |
| C | 7 | 1.6 | 3.8 | 1 |
| D | 6 | 1.8 | 2.0 | 0 |
| E [1] | 6 | 1.6 | 2.8 | 3 0 |
| F [2] | 6 | 1.6 | 2.8 | 2 |
| G | 6 | 1.5 | 2.8 | 1 |
| H | 6 | 1.4 | 2.8 | 0 |

[1] The liquid vehicle was composed of 25% refined and bleached, cottonseed oil and 75% soybean oil hydrogenated to an iodine value of about 110.
[2] The liquid vehicle was soybean oil hydrogenated to an iodine value of about 105.
[3] After 1 week at 100° F.

Using recipes customarily incorporating plastic shortening, batters for white, yellow, and chocolate cakes were prepared with each of the above shortenings, a portion of each batter being mixed by hand and another portion by an electric mixer. Cakes were baked with each of these batters and compared with similar cakes in which the shortening was a widely-retailed "high-ratio" plastic shortening sold under the trade name "Crisco." A comparison of the sizes of each type cake made by the liquid shortenings and the plastic shortenings showed differences in volume not exceeding about 10%. This amount of variation is not generally noticeable to the average user in the home. The cakes were comparable in eating qualities and appearance, being moist and fine grained and textured.

Pastries and cookies made with the liquid shortenings were comparable in quality to those made with plastic shortenings. In making pie crusts, it was desirable to add some extra flour to the doughs made with liquid shortenings in order to make the dough less sticky and easier to roll out. The resulting crusts were tender and flaky.

In use of a shortening for frying, it is desirable that a minimum of smoking occur when the shortening is heated to frying temperatures. As a test for suitability in frying, the smoke points of each of these shortenings and for "Crisco" were measured using the American Oil Chemists' Society Method Cc 9a–48, revised November 1948. In this test a sample of oil or melted fat is heated under controlled conditions. The smoke point is the temperature at which the sample begins to give off a thin, continuous stream of bluish smoke. None of the liquid shortenings listed in Table I had a smoke point lower than that of "Crisco" (about 360° F.).

*Example 2.*—A liquid shortening was prepared with refined, winterized, bleached, and deodorized cottonseed oil as the liquid vehicle. The shortening contained 3% solid glycerides derived from rapeseed oil hydrogenated to an iodine value of about 8. The composition was approximately 1.2% monoglycerides, 1.2% diglycerides, 0.6% triglycerides. In addition the shortening contained 2% triglycerides of soybean oil hydrogenated to an iodine value of about 8. A yellow cake was baked from a batter made with this shortening. This cake was compared with cakes baked under similar conditions and using similar recipes in which the shortening used was "Crisco," and cottonseed oil alone. Table II illustrates the volumes of the resulting cakes.

Table II

| Shortening Used | Cake Volume (cc.) |
| --- | --- |
| Liquid shortening | 1,280 |
| Oil | 1,090 |
| Plastic Shortening "Crisco" | 1,335 |

*Example 3.*—A liquid shortening was prepared containing refined, winterized, bleached, and deodorized cottonseed oil as the liquid vehicle, and containing 3% solid glycerides derived from cottonseed oil hydrogenated to an iodine value of about 8. The solids comprised approximately 1.2% monoglycerides, 1.2% diglycerides and 0.6% triglycerides. A yellow cake batter was prepared using this composition as shortening. Similar batters were prepared in which the shortenings used were the plastic shortening "Crisco" and cottonseed oil alone. Table III shows the volumes of cakes baked from these batters.

Table III

| Shortening Used | Cake Volume (cc.) |
| --- | --- |
| Liquid shortening | 1,080 |
| Oil | 990 |
| Plastic shortening | 1,200 |

Another method of facilitating formation of beta-phase crystals is by "double-chilling," in which beta-phase crystals formed by an initial chilling and subsequent heating step serve as nuclei for further beta-phase crystal formation during a second chilling step.

*Example 4.*—A stable liquid shortening was prepared using winterized cottonseed oil as the liquid vehicle. The solid glycerides were derived from cottonseed oil hydrogenated to an iodine value of about 8. The total solids content was 4%, of which about 1.4% were monoglycerides, about 1.8% were diglycerides and about 0.8% were triglycerides. This shortening was prepared by melting the solid glycerides, mixing with the liquid vehicle, and chilling in a chilling machine to 70° F. as in Example 1. The mixture was then heated to 90° F. in a heat exchanger, and agitated in a tank for one-half hour, maintaining the temperature at 90° F. It was then passed through a second chiller where it was chilled to 50°, and subsequently passed through a picker box. This shortening produced cakes comparable in volume with those made with a conventional "high-ratio" plastic shortening. After storage for two months at 100° F. the oil separation was only 3%.

Thus, a liquid shortening can now be made which for the first time, so far as we are aware, is interchangeable with plastic shortenings in a wide range of conventional baked goods recipes. In addition it is far more convenient to use in that no time is required for melting, measuring is simplified, and mixing is easily accomplished without necessity of "blending" solids together as in a plastic shortening. Cakes made with this liquid shortening are tender and moist and possess good keeping qualities.

What is claimed is:

1. An opaque to translucent liquid shortening consisting essentially of a liquid glyceride vehicle and, in stable suspension therein, from about 2% to about 10% of finely divided, substantially fully saturated fatty glycerides, at least 80% of said saturated glycerides being in the form of beta-phase crystals, said saturated glycerides including from about 1.0% to about 2.5%, by weight of shortening, of monoglycerides of fatty acids having from 16 to 22 carbon atoms, and from about 0% to about 9.0%, by weight of shortening, of diglycerides of fatty acids having from 16 to 22 carbon atoms, said shortening having an increase in solids content of not more than 20% of the solids content at 100° F. when said shortening is cooled from 100° to 60° F., said shortening being pourable at a temperature as low as 60° F.

2. The liquid shortening according to claim 1 wherein the liquid glyceride vehicle is derived from a fatty material selected from the group consisting of cottonseed oil, soybean oil, peanut oil, rapeseed oil, sesame seed oil, sunflower seed oil, palm oil, lard, low molecular synthetic fats, and mixtures thereof.

3. The liquid shortening according to claim 1 wherein the liquid glyceride vehicle is derived from cottonseed oil.

4. The liquid shortening according to claim 1 wherein the liquid glyceride vehicle is derived from soybean oil.

5. The liquid shortening according to claim 1 wherein the liquid glyceride vehicle is a low molecular synthetic fat.

6. The liquid shortening according to claim 1 wherein the substantially fully saturated fatty glycerides are derived from fatty materials selected from the group consisting of cottonseed oil, sunflower seed oil, linseed oil, hazelnut oil, soybean oil, peanut oil, olive oil, corn oil, palm oil, lard, tallow, and mixtures thereof.

7. The liquid shortening according to claim 1 wherein the substantially fully saturated fatty glycerides are derived from hydrogenated soybean oil.

8. The liquid shortening according to claim 1 wherein the substantially fully saturated fatty glycerides are derived from hydrogenated cottonseed oil.

9. The liquid shortening according to claim 1 wherein both the liquid glyceride vehicle and the substantially fully saturated fatty glycerides are derived from cottonseed oil.

10. The liquid shortening according to claim 1 wherein both the liquid glyceride vehicle and the substantially fully saturated fatty glycerides are derived from soybean oil.

11. The liquid shortening according to claim 1 wherein the liquid glyceride vehicle is derived from cottonseed oil and the substantially fully saturated fatty glycerides are derived from hydrogenated soybean oil.

12. The shortening according to claim 1 wherein the liquid glyceride vehicle is derived from a fatty material selected from the group consisting of cottonseed oil, soybean oil, peanut oil, rapeseed oil, sesame seed oil, sunflower seed oil, palm oil, lard, low molecular synthetic fats, and mixtures thereof, and wherein the substantially fully saturated fatty glycerides are derived from fatty materials selected from the group consisting of cottonseed oil, sunflower seed oil, linseed oil, hazelnut oil, soybean oil, peanut oil, olive oil, corn oil, palm oil, lard, tallow, and mixtures thereof.

13. An opaque to translucent liquid shortening consisting essentially of a liquid glyceride vehicle and, in stable suspension therein, from about 5% to about 7% of finely divided, substantially fully saturated fatty glycerides, at least 85% of said saturated glycerides being in the form of beta-phase crystals, said saturated glycerides including from about 1.0% to about 2.3%, by weight of shortening, of monoglycerides of fatty acids having from 16 to 22 carbon atoms, and from about 1.0% to about 2.3%, by weight of shortening, of diglycerides of fatty acids having from 16 to 22 carbon atoms, said shortening having an increase in solids content of not more than 20% of the solids content at 100° F. when said shortening is cooled from 100° to 60° F., said shortening being pourable at a temperature as low as 60° F.

14. The liquid shortening according to claim 13, wherein the liquid glyceride vehicle is derived from a fatty material selected from the group consisting of cottonseed oil, soybean oil, peanut oil, rapeseed oil, sesame seed oil, sunflower seed oil, palm oil, lard, low molecular synthetic fats, and mixtures thereof, and wherein the substantially fully saturated fatty glycerides are derived from fatty materials selected from the group consisting of cottonseed oil, sunflower seed oil, linseed oil, hazelnut oil, soybean oil, peanut oil, olive oil, corn oil, palm oil, lard, tallow, and mixtures thereof.

15. The liquid shortening according to claim 13 wherein the liquid glyceride vehicle is derived from cottonseed oil and the substantially fully saturated fatty glycerides are derived from hydrogenated soybean oil.

16. The method of making a liquid shortening which comprises forming a mixture, at a temperature sufficiently high to melt all solid fats, of a liquid glyceride vehicle and from about 2% to about 10% of substantially fully saturated fatty glyceride solids, said solids being capable of existing in a stable beta phase, said solids including from about 1.0% to about 2.5%, by weight of shortening, of monoglycerides of fatty acids having from 16 to 22 carbon atoms, and from 0% to about 9.0%, by weight of shortening, of diglycerides of fatty acids having from 16 to 22 carbon atoms, cooling said mixture to a crystallization temperature at which said solids will crystallize, allowing substantially all of said solids to crystallize, and converting the solid phase of the mixture to a beta crystalline phase to such an extent that at least about 80% of the total crystals in the shortening are beta-phase crystals.

17. The method according to claim 16 wherein the non-beta crystals are transformed to beta-phase crystals by heating the mixture of liquid vehicle and crystals to a temperature of 90° to 100° F., and maintaining the temperature of the mixture between 90° and 100° F. until the desired crystalline transformation has occurred.

18. The method according to claim 17 wherein the mixture is agitated slowly during the phase transformation.

19. The method of making a liquid shortening which comprises forming a mixture, at a temperature sufficiently high to melt all solid fats, of a liquid glyceride vehicle and from about 2% to about 10% of substantially fully saturated fatty glyceride solids, said solids being capable of existing in a stable beta phase, said solids including from about 1.0% to about 2.5%, by weight of shortening, of monoglycerides of fatty acids having from 16 to 22 carbon atoms, and from 0% to about 9.0%, by weight of shortening, of diglycerides of fatty acids having from 16 to 22 carbon atoms, cooling said mixture to a crystallization temperature at which said solids will crystallize, allowing substantially all of said solids to crystallize, subjecting the mixture to a temperature lower than the melting temperature of beta-phase crystals but higher than the melting temperature of alpha- and beta-prime-phase crystals to form a mixture of beta-phase crystals and liquid, and cooling said mixture to form additional beta-phase crystals.

References Cited in the file of this patent

UNITED STATES PATENTS

| | | |
|---|---|---|
| 2,132,394 | Coith | Oct. 11, 1938 |
| 2,521,219 | Holman et al. | Sept. 5, 1950 |
| 2,521,242 | Mitchell | Sept. 5, 1950 |
| 2,521,243 | Mitchell | Sept. 5, 1950 |
| 2,721,803 | Ginn | Oct. 25, 1955 |